March 12, 1935. G. A. PAGE, JR 1,993,893
BATTERY INSTALLATION
Filed March 2, 1933
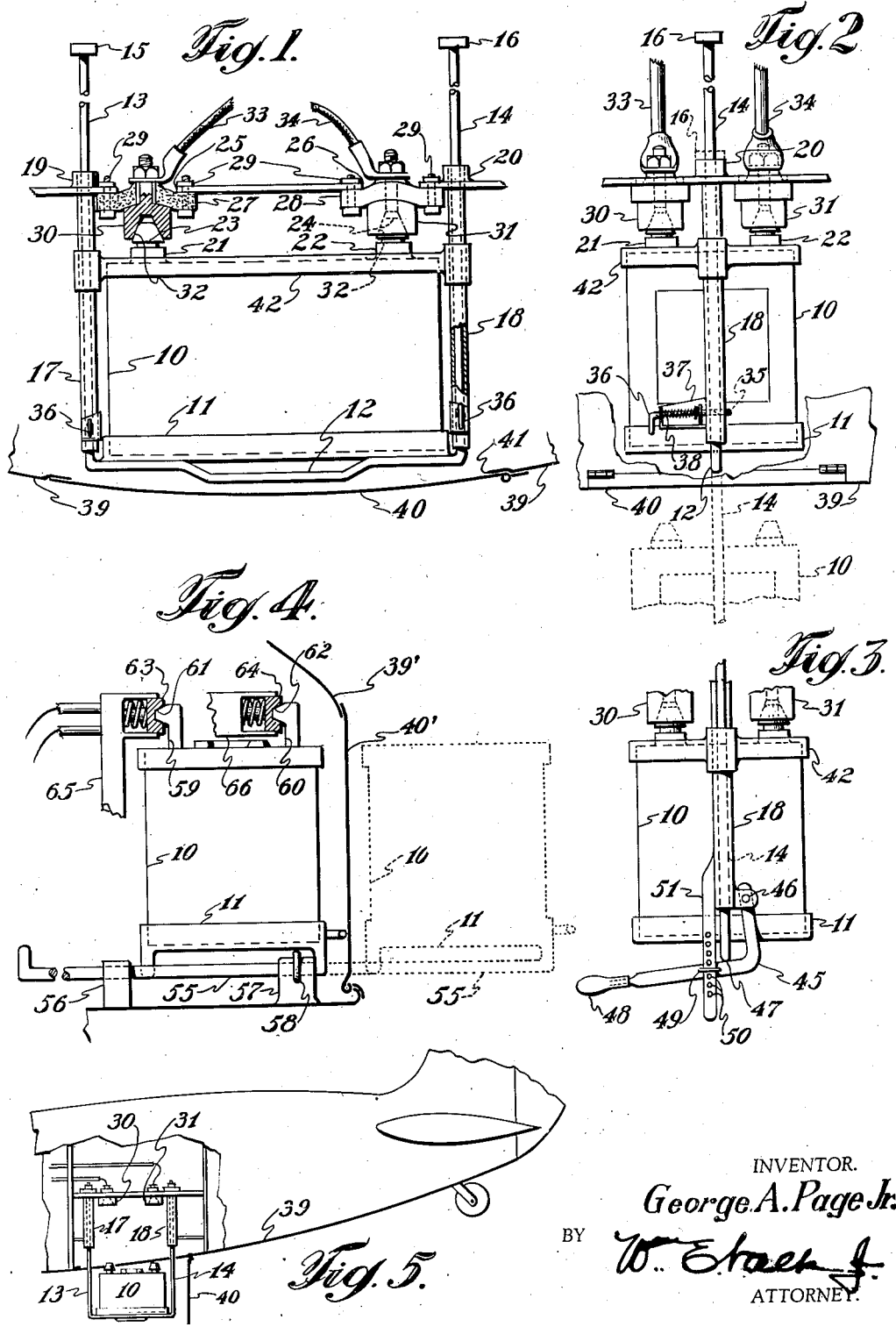
INVENTOR.
George A. Page Jr.
BY
ATTORNEY.

Patented Mar. 12, 1935

1,993,893

UNITED STATES PATENT OFFICE 1,993,893

BATTERY INSTALLATION

George A. Page, Jr., Ferguson, Mo., assignor to Curtiss-Wright Airplane Company, Inc., a corporation of Delaware Application March 2, 1933, Serial No. 659,283

1 Claim. (Cl. 136—173)

This invention relates to improvements in devices for carrying storage batteries in vehicle bodies, and is more particularly concerned with a provision of means which will greatly facilitate servicing of storage batteries.

An object of the invention is to provide a movable rack or tray on which a battery may be mounted outside of the confines of a vehicle body, the rack with the battery being organized to be moved into a compartment in the vehicle body.

A further object is to provide resiliently supported electrical contacts within the vehicle body, adapted to engage the battery terminals upon movement of the battery within the compartment.

A further object is to provide suitable means for locking the battery within the compartment.

Further objects will be apparent from a reading of the subjoined specification and claim, and from a consideration of the accompanying drawing, in which:

Fig. 1 is a side elevation of a battery mounted according to the invention within a vehicle body, one of the electrical terminals being shown in section and a portion of the vehicle body being indicated;

Fig. 2 is an end elevation of the battery and the mounting mechanism of Fig. 1;

Fig. 3 is generally similar to Fig. 2 showing an alternative method of locking the battery in its operative position;

Fig. 4 is an alternative embodiment of the mounting device wherein the battery is adapted to slide laterally; and Fig. 5 is a diagrammatic elevation of an aircraft body, partly broken away to show the battery mounting.

In using storage batteries in vehicles, it is usually the practice to provide a compartment into which the battery may be manually placed, after which the terminal cables are attached direct to the battery posts or terminals. Frequently, the battery compartment is in a rather inaccessible part of the vehicle body, causing great difficulty for an attendant in removing or replacing a battery which, of course, is quite heavy.

My invention, referring to Fig. 1, provides a battery 10 which rests in a tray 11. Around the bottom of the tray a substantially U-shaped rod is arranged, the lower part of the rod having a handle 12 formed as part thereof, and the upstanding end portions 13 and 14 of the rod projecting vertically upward a considerable distance above the battery. At the top of each end portion 13 and 14, stops 15 and 16 are provided. Mounted on the vehicle frame are a pair of vertically disposed tubes 17 and 18, fastened at their upper ends as at 19 and 20 to the vehicle structure. The upstanding portions 13 and 14 of the rod engage within the tubes 17 and 18, respectively, so that the tray 11 with the battery 10 may be slid either up or down, the tubes 17 and 18 forming guides for the rod portions 13 and 14. The lower limit of sliding of the tray and battery is established by the stops 15 and 16. The normal battery terminals 21 and 22 are provided with conically shaped ends 23 and 24. The vehicle structure, between the tubes 17 and 18, has a pair of spaced openings 25 and 26 over which are attached a pair of rubber pads 27 and 28, as by bolts 29. Contacting devices 30 and 31 are fastened centrally in the pads 27 and 28, each such contact having a conical recess 32 within which the battery terminals 23 and 24 may engage when the battery is in its upper position. Cables 33 and 34, attached to the contacts 30 and 31, serve to connect the battery with other electrical appliances which it is adapted to operate.

It will be appreciated that when the battery 10 is pushed firmly upward by means of the handle 12, the rubber pads 27 and 28 will press the contacts 30 and 31 firmly against the battery terminals, establishing good electrical contact which cannot be displaced by vibration or shock, the rubber pads automatically taking care of any slight misalinement of the terminals and contacts.

The tubes 17 and 18, and the rod portions 13 and 14 have through registering openings respectively, such as 35, these openings being adapted to register when the battery is in its upper position and when firm electrical contact is established at the terminals. A locking piece 36, slidable in a bracket 37 is adapted to engage within the opening 35 and hold the battery in position. Withdrawal of the locking piece 36 against a spring 38 allows the battery to be lowered outside of the confines of the body structure, to a position such as is indicated in dotted lines in Fig. 2. In such position, the battery may be readily removed, inspected or serviced. The body structure 39 may be provided with a door 40, covering an opening 41 formed in the body covering through which the battery may be raised or lowered. An upper frame 42, carried by the tubes 17 and 18, engages the upper end of the battery 10, locating it, when the battery is within the compartment, against tipping or inversion.

In Fig. 3, the battery 10 carried in a tray 11, is arranged in an identical manner to that described in Figs. 1 and 2, with the exception of the device for locking the battery in its upper position. Instead of the locking piece 36, a bent lever 45 is pivoted as at 46 to the tube 18, one arm of the bell crank being adapted to engage the central portion of the supporting rod as at 47 when the battery has been partly elevated. Upward movement of a handle 48 pushes the battery against the electrical contacts 30 and 31, whereupon the arm may be locked in a fixed position by inserting a pin 49 within one of several openings 50 in a bracket 51 attached to the tube 18. A suitable slot is provided in the lever 45 within which the pin 49 may also engage. The several openings 50 are provided so that batteries of different size may be accommodated.

Fig. 4 shows an alternative embodiment of the device, wherein the battery 10 is adapted to move laterally on rods 55, which carry the battery tray 11 and which are adapted to slide in guides 56 and 57. By dropping the cover 40' which covers an opening 41 in the body structure 39' the battery may be slid laterally along the guides to a position outside of the body such as is indicated in the dotted lines. A locking pin 58, engaging in an opening in the guide 57 and in the rod 55 may be inserted to hold the battery in a fixed position within the compartment. The battery terminals 59 and 60 are arranged with conical ends 61 and 62 pointing laterally inward, to engage horizontal contact pieces 63 and 64, resiliently held in rigid brackets 65 and 66, mounted on the vehicle body. It will thus be seen by pushing the battery firmly against the contacts 63 and 64, and by inserting the locking pin 58, firm electrical contact of the battery terminals with the contacts is established.

While I have described my invention in detail in its present preferred embodiment, it will be obvious to those skilled in the art, after understanding my invention, that various changes and modifications may be made therein without departing from the spirit or scope thereof. I aim in the appended claim to cover all such modifications and changes.

What is claimed is:

In an aircraft battery mounting, a support having spaced guide tubes extending downwardly therefrom, said support having openings between said tubes, resilient insulating blocks covering said openings and attached to said support, metallic contact elements carried by said blocks, said elements being resiliently movable with respect to said support and being insulated therefrom, a tray having upwardly extending rods engaging within said tubes, said tray and tubes being slidable together up and down with respect to said support, said tray being adapted to contain a storage battery having terminals on its upper surface, said contact elements being organized to engage said terminals upon raising of said tray and battery, whereby, upon raising of said tray and battery, said blocks will be resiliently deflected to impose pressure on said contacts in their engagement with said terminals, means for locking said tray and battery in a raised position whereby said contact elements and terminals are held in firm engagement, and stops on said rods positioned to engage the upper portions of said tubes to limit the downward movement of said tray and battery.

GEORGE A. PAGE, Jr.